(12) United States Patent
Garlapati et al.

(10) Patent No.: US 12,530,672 B2
(45) Date of Patent: Jan. 20, 2026

(54) PRE-AUTHORIZED TRANSFER

(71) Applicant: Wells Fargo Bank, N.A., San Francisco, CA (US)

(72) Inventors: Sreenivasa Reddy Garlapati, Hyderabad (IN); Samanth Mathi, Hyderabad (IN)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

(21) Appl. No.: 18/469,116

(22) Filed: Sep. 18, 2023

(65) Prior Publication Data
US 2024/0005298 A1 Jan. 4, 2024

Related U.S. Application Data

(63) Continuation of application No. 17/454,513, filed on Nov. 11, 2021, now Pat. No. 11,797,975.

(51) Int. Cl.
*G06Q 20/32* (2012.01)
*G06K 7/14* (2006.01)

(52) U.S. Cl.
CPC ....... *G06Q 20/3276* (2013.01); *G06K 7/1417* (2013.01)

(58) Field of Classification Search
CPC .................. G06Q 20/3276; G06Q 20/3274
See application file for complete search history.

(56) References Cited

U.S. PATENT DOCUMENTS

| | | | |
|---|---|---|---|
| 9,607,483 B2 | 3/2017 | Block et al. | |
| 9,911,102 B2 | 3/2018 | Bowles et al. | |
| 10,147,076 B2 | 12/2018 | Zhou et al. | |
| 10,275,827 B2 | 4/2019 | Mccarthy et al. | |
| 11,074,562 B1 | 7/2021 | Phillips | |
| 2012/0173311 A1 | 7/2012 | Chang et al. | |
| 2013/0232064 A1 | 9/2013 | Bosch | |
| 2014/0032345 A1 | 1/2014 | Moore | |
| 2016/0012465 A1 | 1/2016 | Sharp | |
| 2019/0164161 A1 | 5/2019 | Sultan et al. | |

(Continued)

OTHER PUBLICATIONS

"U.S. Appl. No. 17/454,513, Advisory Action mailed May 5, 2023".

(Continued)

*Primary Examiner* — Edward Chang
(74) *Attorney, Agent, or Firm* — SCHWEGMAN LUNDBERG & WOESSNER, P.A.

(57) ABSTRACT

Various examples described herein are directed to systems and methods that provide a pre-authorized amount from a user to an intended recipient that is remote from the user. A quick response (QR) code provided from a recipient is read. The QR code includes the pre-authorized amount to be withdrawn from an account associated the user and image data associated with the intended recipient. Image data associated with the recipient is captured. Image analysis is performed on the captured image data associated with the recipient. The analyzed captured image data associated with the recipient is compared with the image data associated with the intended recipient. A determination is then made if the recipient is the intended recipient based on the comparison. When the recipient is the intended recipient, the pre-authorized amount is provided to the recipient from the account associated with the user.

10 Claims, 12 Drawing Sheets

(56) References Cited

U.S. PATENT DOCUMENTS

| | | | |
|---|---|---|---|
| 2019/0206174 A1 | 7/2019 | Miu et al. | |
| 2020/0005263 A1 | 1/2020 | Arora et al. | |
| 2022/0374878 A1* | 11/2022 | Andral | G06Q 20/401 |

OTHER PUBLICATIONS

"U.S. Appl. No. 17/454,513, Final Office Action mailed Feb. 16, 2023".

"U.S. Appl. No. 17/454,513, Non Final Office Action mailed Jul. 19, 2022".

"U.S. Appl. No. 17/454,513, Notice of Allowance mailed Jun. 16, 2023".

"U.S. Appl. No. 17/454,513, Response filed Apr. 17, 2023 to Final Office Action mailed Feb. 16, 2023", 8 pgs.

"U.S. Appl. No. 17/454,513, Response filed May 15, 2023 to Advisory Action mailed May 5, 2023", 10 pgs.

"U.S. Appl. No. 17/454,513, Response filed Oct. 19, 2022 to Non Final Office Action mailed Jul. 19, 2022".

"Introducing a Next-generation ATM with face recognition and QR code reader", Seven Bank, Ltd. NEC Corporation, [Online]. Retrieved from the Internet: <URL: https://www.sevenbank.co.jp/english/ir/pdf/2019/20190912_E1.pdf>, (9/1219), 6 pgs.

Patil, Rahul, et al., "Efficient Cash Withdrawal from ATM Machine Using QRcode Technology", 5th International Conference on Computing Communication Control and Automation (ICCUBEA), [Online]. Retrieved from the Internet: <URL: https://ieeexplore.ieee.org/stamp/stamp.jsp?tp=&arnumber=9128996 >, (2019), 3 pgs.

Soundari, D V, et al., "Enhanced Security Feature of ATM's Through Facial Recognition", Proceedings of the Fifth International Conference on Intelligent Computing and Control Systems (ICICCS), [Online]. Retrieved from the Internet: <URL: https://ieeexplore.ieee.org/stamp/stamp.jsp?tp=&arnumber=9432327 >, (2021), 5 pgs.

\* cited by examiner

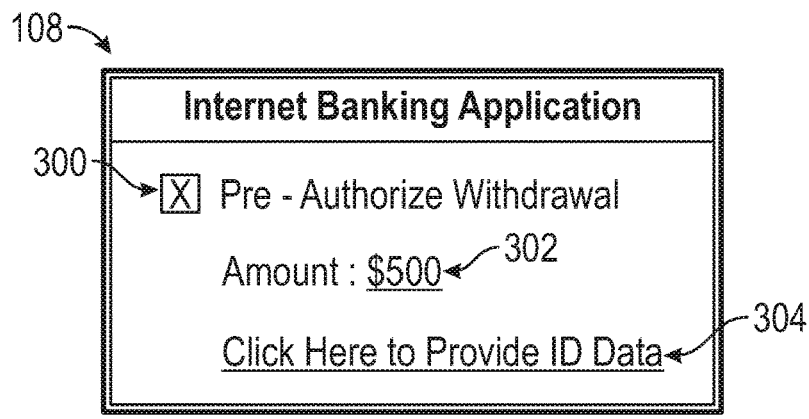
FIG. 3
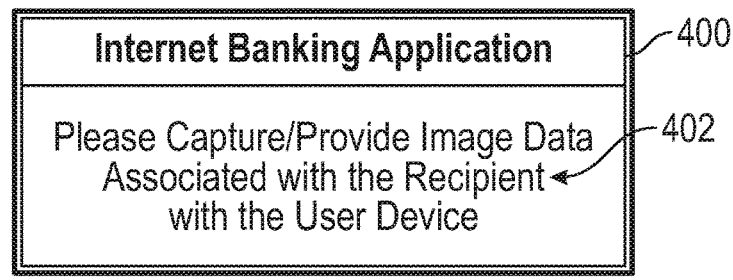
FIG. 4
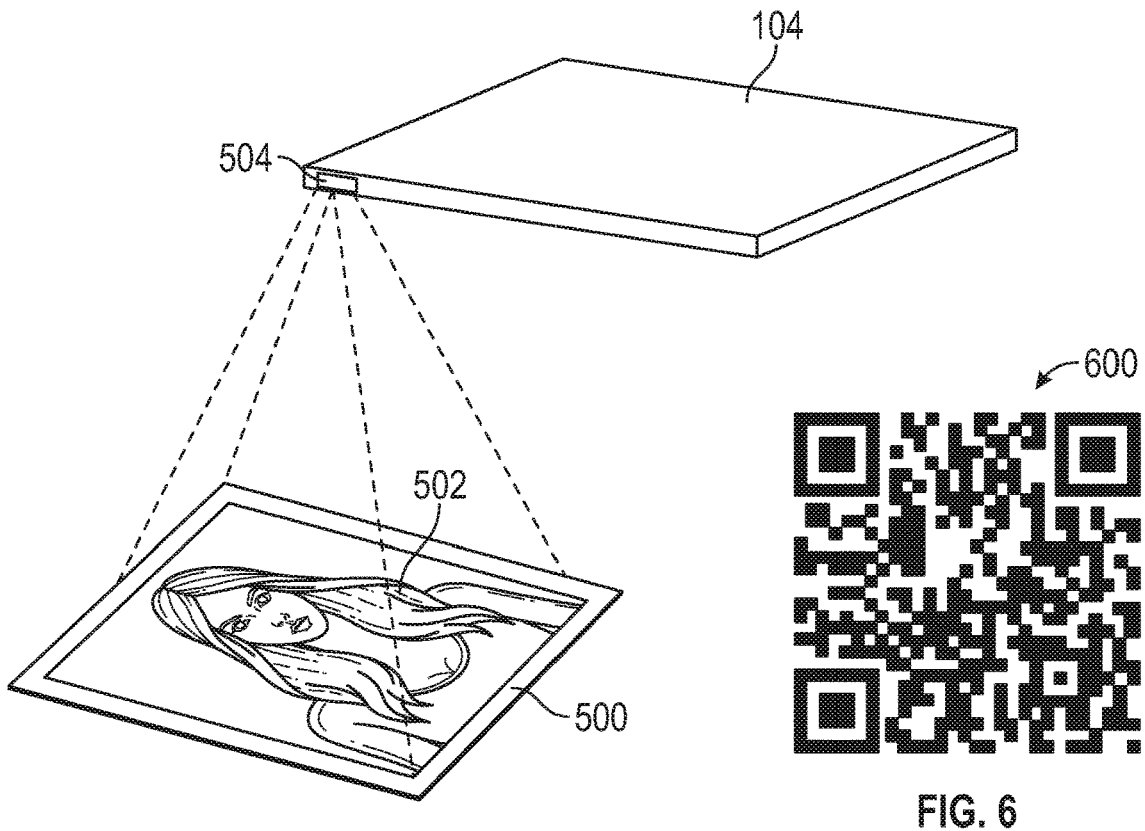
FIG. 5
FIG. 6

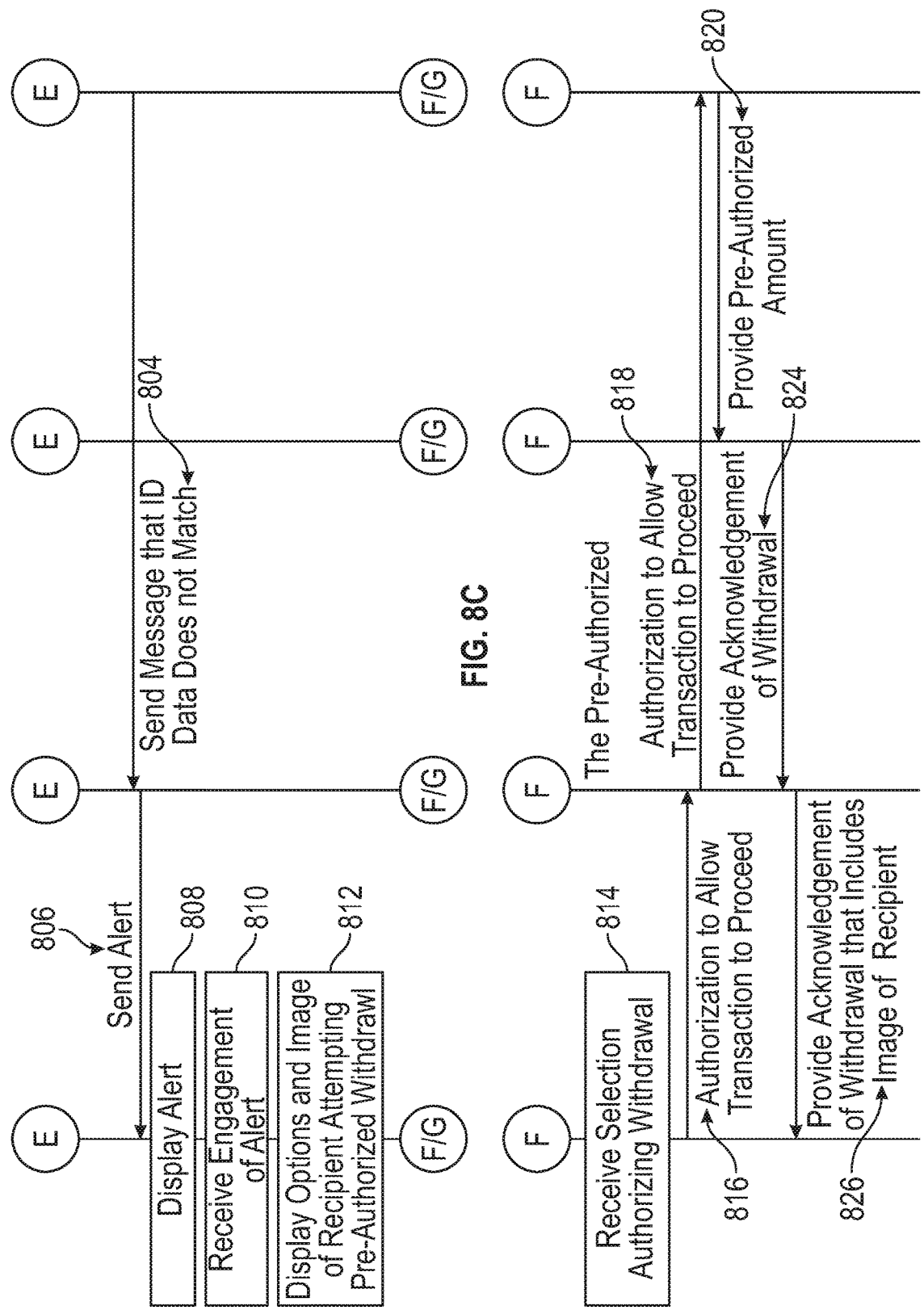

PRE-AUTHORIZED TRANSFER

CROSS-REFERENCE TO RELATED APPLICATION

This application is a continuation of U.S. patent application Ser. No. 17/454,513, filed Nov. 11, 2021, which is incorporated by reference herein in its entirety.

BACKGROUND

Occasionally, a user may need to provide money to a recipient in a short period of time. As an example, a parent may need to provide their child with money in order to allow the child to make an immediate purchase, such as money for books when their child is at school. In this scenario, there are a number of ways for the parent to provide money to their child. The parent can physically withdraw the money from their account at an automated teller machine (ATM), at a branch of a bank, or a bank kiosk. Afterwards, the parent can physically provide the money to their child. In addition, the child can accompany the parent to the ATM, the bank branch, or the bank kiosk in order to receive the money when the parent withdraws the money from their account. In either event, the parent must be located proximate with their child in order to affect the transfer of money from their account to the child. Further, the parent may wire money to their child using various money wire services or applications. However, using these services incurs fees.

SUMMARY

Therefore, what is needed is technical solution that provides a system and method and solves the technical problems of allowing a user to provide money to a recipient from an account associated with the user without requiring the user to be located proximate to the recipient. Moreover, the system and method should provide the technical solution of allowing the user to affect the transfer to the recipient without using a third party and incurring wiring fees associated with the third party by allowing the recipient to directly withdraw the money from the account of the user.

Embodiments solve the problems noted above by providing a system and method of allowing a user to pre-authorize an intended recipient to withdraw money from an account associated with the user at a location remote from a location of the user. In an embodiment, a user may pre-authorize an intended recipient to withdraw money from a user account associated with the user at a location that is remote from the user. The intended recipient otherwise lacks access to the account associated with the user. In an embodiment, the user can indicate an amount the intended recipient is authorized to withdraw from the user account along with identification (ID) data associated with the intended recipient. The ID data can be an image of the intended recipient. The amount the intended recipient is authorized to withdraw along with the ID data is used to generate a quick response (QR) code. In an embodiment, the user can forward the QR code to the intended recipient. When the intended recipient desires to access the user account, the intended recipient presents the QR code. Moreover, ID data associated with the intended recipient is captured at the location where the intended recipient is attempting to withdraw the money. In an embodiment, the location where the intended recipient is attempting to withdraw the money is remote from a location of the user associated with the user account.

The ID data captured at the location where the intended recipient is attempting to withdraw the money is analyzed and compared with the ID data provided by the user associated with the user account using image analysis. If the captured ID data matches the ID data provided by the user, the intended recipient is able to withdraw the money from the user account. Moreover, the user is informed of the successful withdrawal.

If the captured ID data does not match the ID data provided by the user associated with user account, an alert is sent to the user. The alert can indicate to the user that a withdrawal was attempted using the QR code. Moreover, the alert can include the captured ID data. In an embodiment, the user can examine the captured ID data and authorize the withdrawal based on the captured ID data.

BRIEF DESCRIPTION OF FIGURES

FIG. 3 illustrates a UI that provides an internet banking application according to an embodiment of the present disclosure.

FIG. 4 illustrates a UI that prompts a user to capture ID data according to an embodiment of the present disclosure.

FIG. 5 illustrates capturing ID data for an intended recipient according to an embodiment of the present disclosure.

FIG. 6 shows a QR code that includes data corresponding to a pre-authorized amount that can be withdrawn from a user account along with ID data associated with an intended recipient according to an embodiment of the present disclosure.

FIGS. 8A-8E describe a process flow for allowing a user to pre-authorize withdrawal of money from a user account associated with a user and then allow withdrawal of the pre-authorized amount when captured ID data does not match ID data in a QR code, in accordance with an embodiment of the present disclosure.

DETAILED DESCRIPTION

Figure 1:
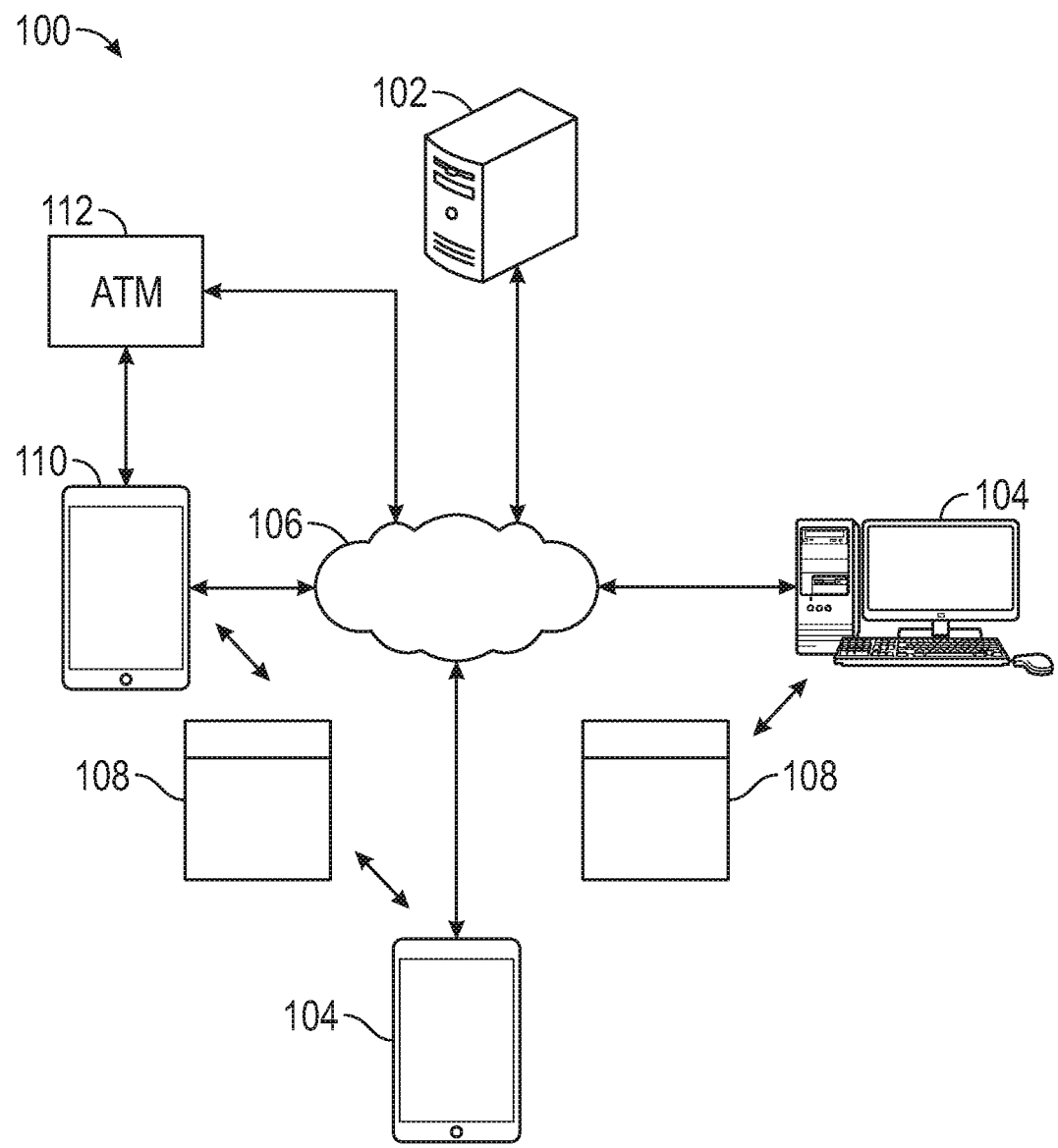
FIG. 1 shows an environment in which embodiments of the present disclosure may operate.

Now making reference to the Figures, and more specifically FIG. 1, an environment 100 is shown in which embodiments of the present solution may operate. The environment 100 can include a server 102 in communication with user devices 104 and a network 106. Via the network 106, the server 102 communicates with the user devices 104 and provides user interfaces (UIs) 108 for display on the user devices 104. Moreover, the server 102 communicates with a recipient device 110 via the network 106.

As will be discussed in greater detail below, each of the server 102, the user devices 104, and the recipient device 110 may incorporate an architecture that facilitates operation in the capacity of either a server of a client machine in server-client network environments, where each of these devices may be implemented as any type of computing device, such as a server computer, a personal computer (PC), or the like each having a processor configured to perform the subject matter disclosed herein. The server 102, the user devices 104, and the recipient device 110 may be any computing device suitable for use by a user. For example, the devices may be a desktop computer, a tablet computer, a portable media device, or a smart phone belonging to a user. Throughout this disclosure, reference may be made to a user device 104 and user devices 104. It should be pointed out that the term "user device 104" is interchangeable with the term "user devices 104." Thus, any description for the user device 104 is applicable to the user devices 104. Likewise, any description for the user devices 104 is applicable to the user device 104.

The network 106 may be any network that enables communication between or among machines, databases, and devices (e.g., the server 102, the user devices 104, and the recipient device 110). Accordingly, the network 106 may be a wired network, a wireless network (e.g., a mobile or cellular network), or any suitable combination thereof. The network 106 may include one or more portions that constitute a private network, a public network (e.g., the Internet), or any suitable combination thereof. Accordingly, the network 106 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof.

Any one or more portions of the network 106 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

The user devices 104 and the recipient device 110 can be any computing device suitable for use by a user. For example, the user devices 104 can be a desktop computer, a tablet computer, a portable media device, or a smart phone belonging to a user. The UIs 108 can be a graphical user interface that allows a user to directly interact with electronic devices, such as the user devices 104 and the recipient device 110, through graphical elements, such as icons, and/or audio indicators, where the actions in the UIs 108 are performed through direct manipulation of the graphical elements. In addition, the UIs 108 are capable of displaying information received from a user on the user devices 104. Throughout this disclosure, reference may be made to a UI 108 and UIs 108. It should be pointed out that the term "UI 108" is interchangeable with the term "UIs 108." Thus, any description for the UI 108 is applicable to the UIs 108. Similarly, any description for the UIs 108 is applicable to the UI 108.

Figure 2A:
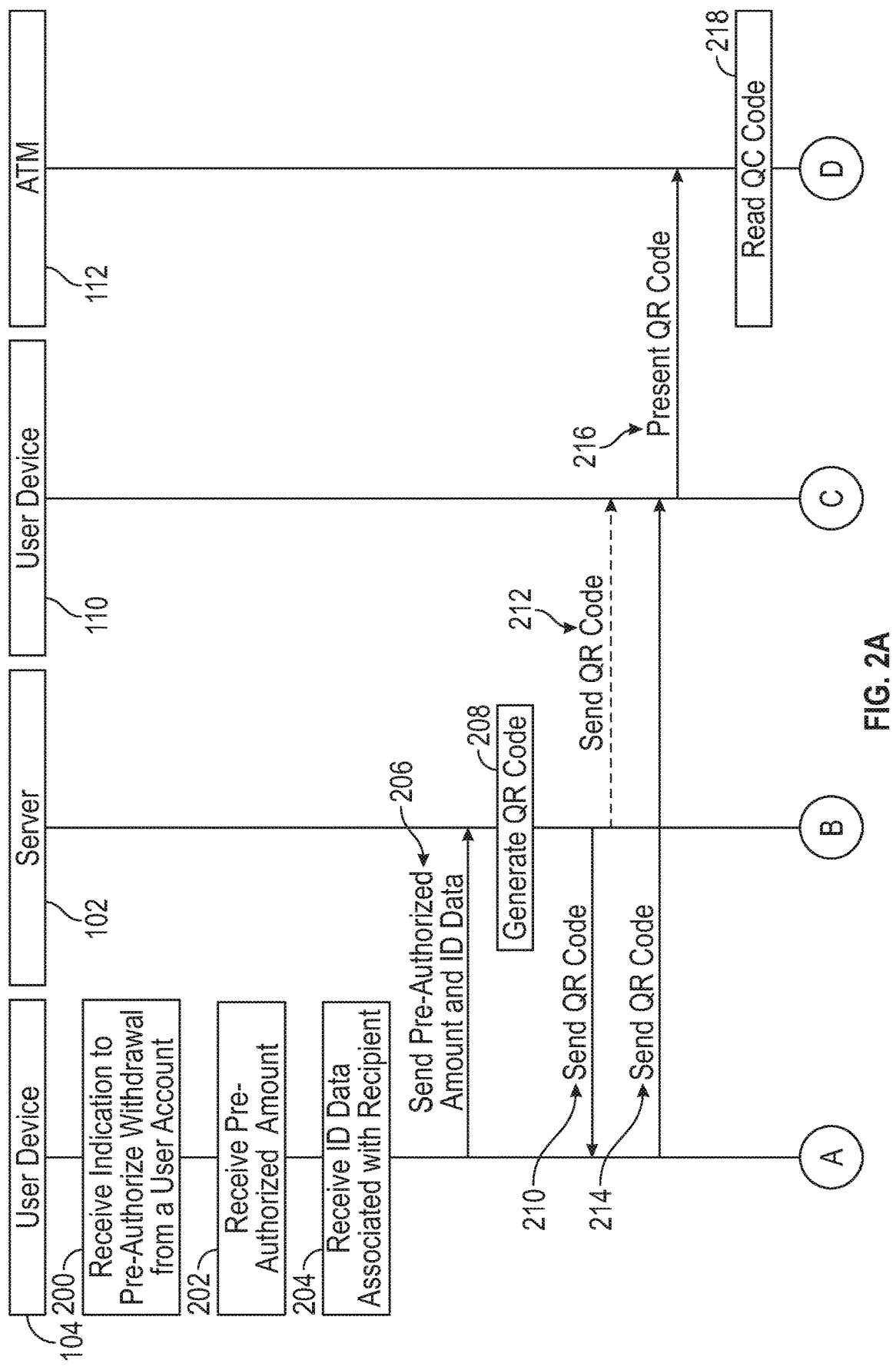
FIGS. 2A and 2B illustrate a process flow for allowing a user to pre-authorize withdrawal of money from a user account associated with a user according to an embodiment of the present disclosure.
Figure 2B:
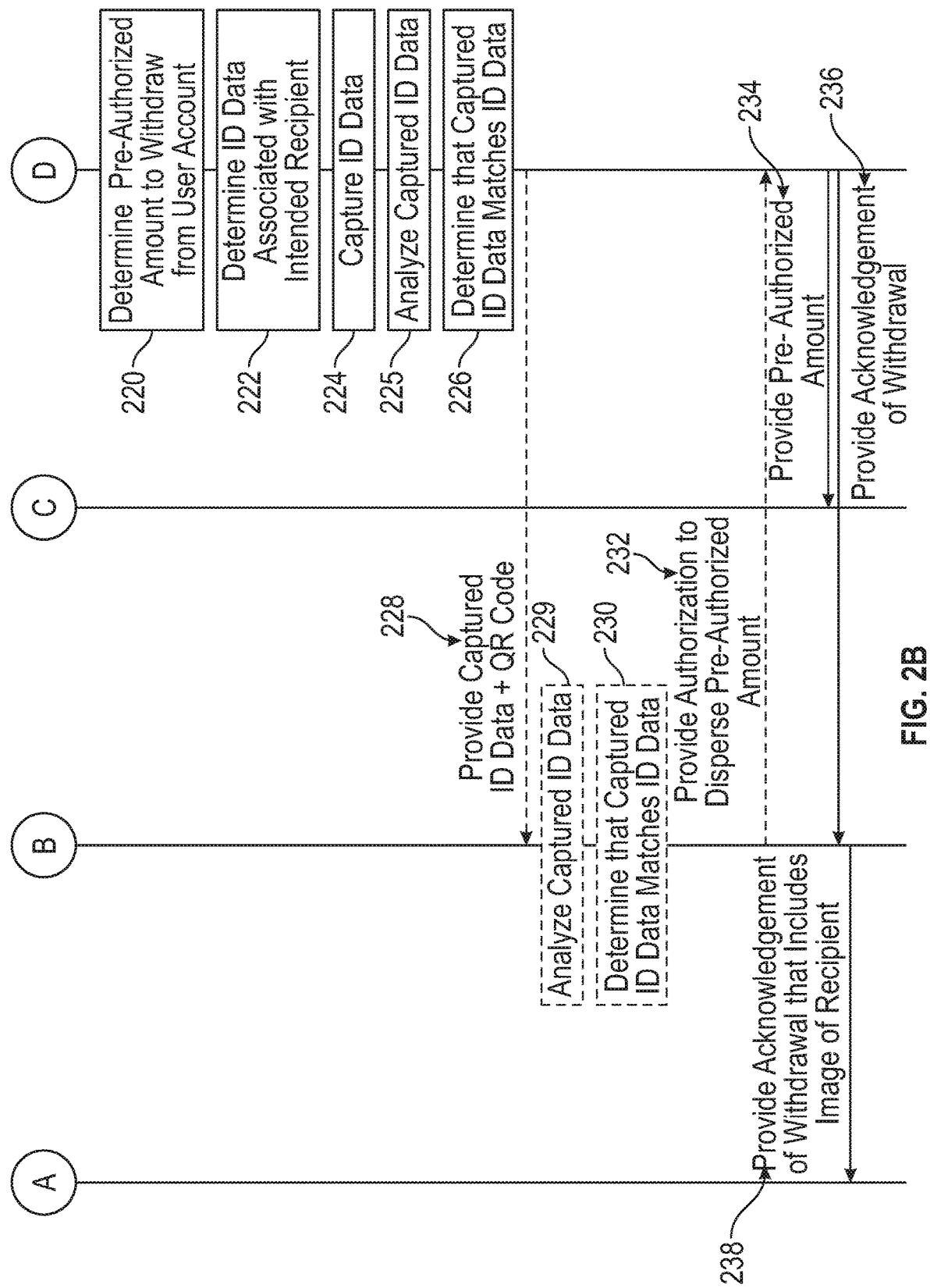

As noted above, embodiments provide a system and method of allowing a user to pre-authorize an intended recipient to withdraw money from an account associated with the user at a location remote from a location of the user. In an embodiment, the user can indicate an amount the intended recipient is authorized to withdraw from the user account along with ID data associated with the recipient. The amount the intended recipient is authorized to withdraw along with the ID data is used to generate a QR code. In an embodiment, the user can forward the QR code to the intended recipient. When the intended recipient desires to access the user account to withdraw the pre-authorized amount, the intended recipient presents the QR code. Moreover, ID data associated with the recipient is captured at the location where the recipient is attempting to withdraw the money in order to confirm that the recipient is the intended recipient, e.g., the person presenting the QR code at a money dispensing machine is actually the recipient the user associated with the user account intended to receive the money. FIGS. 2A and 2B illustrate a process flow for allowing a user to pre-authorize withdrawal of money from a user account associated with a user. It should be noted that while money is described as an item to be withdrawn from a user account by an intended recipient different from a user associated with the user account, embodiments envision any type of instrument or verifiable record that is accepted as payment for goods and services.

Now making reference to FIG. 2A, in an operation 200, an indication to pre-authorize a withdrawal from an account associated with a user is received at the user device 104. In an embodiment, at the user device 104, a user can be provided with the UI 108 on the user device 104 during the operation 200. The UI 108 can be any type of internet banking application or digital wallet that allows for electronic access to user accounts that hold money. Moreover, the UI 108 can be any type of internet banking application or digital wallet that allows a user to make electronic transactions with another user. As shown with reference to FIG. 3, the UI 108 can include a checkbox 300 that provides the user with an option to select a pre-authorization withdrawal. In particular, the user may engage the checkbox 300 with an "X," as shown, or any other type of indicia, such as a check mark, signature, initials, etc. When the user engages the checkbox 300, the user device 104 receives the indication to pre-authorize a withdrawal. In an embodiment, with the UI 108, a user can allow for an intended recipient to withdraw money from a user account associated with the user. In an embodiment, the intended recipient lacks access to the user account, e.g., the intended recipient is not authorized to access the user account or is not associated with the user account. As such, the intended recipient cannot otherwise access the user account. Thus, instead of the user having to transfer the money to an account associated with the intended recipient, which may be time consuming and incur fees, the user can allow for an intended recipient to directly withdraw money from the user account associated with the user.

To further illustrate, in an example, referred to herein as the father/daughter example, a daughter, who is currently located in Minnesota and attending school in Minneapolis, may need to purchase books that cost $500. Thus, the daughter asks her father, who is located in North Carolina, for $500. In the father/daughter example, the father is the user and the daughter is the intended recipient. Moreover, the daughter otherwise lacks access to the account associated with the father, i.e., the daughter cannot access a user account associated with the father. In the father/daughter example, in order to allow the daughter to withdraw the money directly from the user account associated with the father, the father accesses the internet banking application displayed on the UI 108 on the user device 104 associated with the father. During the operation 200, the father checks the checkbox 300 in the UI 108 such that the user device 104 associated with the father receives an indication to pre-authorize a withdrawal from the user account associated with the father. After the user device 104 receives an indication to pre-authorize a withdrawal from a user account, the method performs an operation 202, as shown with reference to FIG. 2A.

In the operation 202, an amount that is pre-authorized for withdrawal is received at the user device 104. In an embodiment, the user may enter an amount at an input field 302 of the UI 108, as shown with reference to FIG. 3. It should be noted that a user may input any amount at the input field 302. Returning to the father/daughter example, as noted above, the daughter needs $500 to cover the costs associated with purchasing books. Thus, during the operation 202, the father enters $500 at the input field 302, as shown with reference to FIG. 3. When the father inputs $500 at the input field 302, the user device 104 associated with the father receives the pre-authorized amount of $500 in the operation 202.

Returning attention to FIG. 2A, when the user decides to pre-authorize a withdrawal, the UI 108 can prompt the user to provide ID data associated with the intended recipient in order to allow the user device 104 to receive ID data associated with the intended recipient during an operation 204. In an embodiment, the UI 108 provides a selector 304 that requests the user click on the selector 304 to provide the ID data during an operation 204. The ID data may be any type of data, such as biometric data, that is unique to the intended recipient and can be used to identify the intended recipient for security purposes. Examples of ID data can include an image of the intended recipient, a fingerprint of the intended recipient, retinal scanning data, or any other type of identifying data that is capable of being captured and transferred using any type of electronic circuitry. In an embodiment, when the user engages the selector 304, such as by clicking on the selector 304, a UI 400 is presented on the user device that includes a prompt 402, as shown with reference to FIG. 4. The prompt 402 requests that the user either capture image data associated with the intended recipient or provide image data associated with the intended recipient. For example, a camera of the user device 104 may automatically be accessed when the selector 304 is engaged and after the prompt 402 is displayed. In an embodiment, using a camera of the user device 104, the user may capture image data associated with an image of the intended recipient. In an embodiment, the image data can be the ID data that is received by the user device 104 during the operation 204. In alternative embodiments, the user can have ID data pre-stored at the user device 104. To further illustrate, the user can have images of the intended recipient that were captured in the past stored on the user device 104. These previously captured images can be provided as the ID data during the operation 204.

In the father/daughter example, after the father enters $500 at the input field 302, the father clicks on the selector 304 and the UI 400 is presented that prompts the father to either capture image data associated with the daughter or provide image data associated with the daughter via the prompt 402. Thus, during the operation 204, the father captures an image 500 (FIG. 5) having image data 502 of his daughter with a camera 504 of the user device 104. In the example, the image data 502 can correspond to the ID data associated with the daughter.

Returning attention to FIG. 2A and the process flow for allowing a user to pre-authorize withdrawal of money from a user account associated with a user, after the user device 104 receives the pre-authorized amount and the ID data in the operations 202 and 204, the user device 104 sends the pre-authorized amount and the ID data to the server 102 during an operation 206. In an alternative embodiment, the user device 104 can also send identification information associated with the user device 110 of the intended recipient along with the pre-authorized amount and the ID date in the operation 206. The identification information can include a phone number associated with the user device 110 of the intended recipient, a social media address associated with the intended recipient, or any other type of contact information that can be used to convey electronic information, such as QR codes, to the intended recipient.

When the server 102 receives the pre-authorized amount and the ID data, the server 102 can generate a QR code during an operation 208. The QR code generated by the server 102 can store the pre-authorized amount along with the ID data. Thus, when the QR code is read, in an embodiment, a device associated with the reader can determine the amount the user of the QR code is authorized to withdraw from the user account using any suitable techniques known to those skilled in the art. Moreover, when the QR code is read, the device associated with the reader can determine the ID data that can be used to verify the person providing the QR code is the intended recipient using any suitable techniques known to those skilled in the art.

In an embodiment, the server 102 can create any type of QR code, such as an IQR code, a secure QR code, a frame QR, a High Capacity Colored 2-Dimensional, or the like, using any well-known, suitable techniques known to those skilled in the art during the operation 208. For example, the QR code can be created using any well-known QR code generator that uses application programming interfaces to automatically fuse and encode data into graphic designs. Examples include QRTiger, QRSTUFF™, QRD.BY, Visualead™, FORQR, or the like. After creating the QR code, the server 102 can forward the QR code to the user device 104 during an operation 210. Optionally, the server 102 can forward the QR code to the user device 110. In the father/daughter example, the user device 104 associated with the father sends the pre-authorized amount of $500 and the ID data associated with his daughter to the server during the operation 206. During the operation 208, the server 102 creates a QR code 600 (FIG. 6) and sends the QR code 600 to the user device 104 during the operation 210.

Returning to FIG. 2A, after the user device 104 receives the QR code during the operation 210, the user device sends the QR code to the user device 110 associated with the intended recipient during an operation 214. Once the user device 110 receives the QR code, the intended recipient associated with the user device 110 can present the QR code to a money dispensing machine 112, such as an ATM, during an operation 216. In the father/daughter example, from the user device 104, the father sends the QR code 600 to the user device 110 associated with the daughter in Minneapolis while the father is located in North Carolina. The daughter then presents the QR code 600 to the money dispensing machine 112 that is located in Minnesota during the operation 216.

The money dispensing machine 112 can include a camera that reads the QR code. Thus, the money dispensing machine 112 can read the QR code during an operation 218 when the recipient presents the QR code, as shown with reference to FIG. 2A. Based on the QR code, the money dispensing machine 112 can determine the pre-authorized amount of money to withdraw from the user account of the user associated with the user device 104 during an operation 220. Moreover, based on the QR code, during an operation 222, the money dispensing machine 112 can glean the ID data associated with the intended recipient and determine that ID data of the recipient associated with the user device 110 should be captured.

During an operation 224, the money dispensing machine 112 captures ID data of the recipient associated with the user device 110. To further illustrate, in instances where the ID data includes an image of the intended recipient, the money dispensing machine 112 can capture an image of the person associated with the user device 110 using the money dispensing machine camera. In instances where the ID data includes a fingerprint of the intended recipient, the money dispensing machine 112 can include a fingerprint reader to read the fingerprint of the recipient associated with the user device 110. Furthermore, in instances where the ID date includes retinal scanning data, the money dispensing machine can include a retinal scanner to capture ID data of the recipient associated with the user device 110.

Regardless of the type of ID data, once the money dispensing machine 112 captures the ID data during the operation 224, the money dispensing machine 112 analyzes the captured ID data during an operation 225 and determines that the ID data captured during the operation 224 matches the ID data gleaned from the QR code during an operation 226. Thus, the money dispensing machine 112 can determine that the recipient associated with the user device 110 that presented the QR code during the operation 216 is the intended recipient. To further illustrate, the money dispensing machine 112 can perform an image analysis on the captured ID data and compare the image analysis with the ID data gleaned from the QR code during the operation 225. In this illustration, the money dispensing machine 112 can use digital image processing techniques to extract information from the captured image. The money dispensing machine 112 can employ pattern recognition, digital geometry, signal processing during digital image processing, or the like. Examples of techniques that can be used include 2D and 3D object recognition, image segmentation, single particle tracking, optical flow, 3D Pose Estimation, or any other suitable techniques. In an embodiment, after the money dispensing machine 112 performs image analysis on the captured ID data, the money dispensing machine can compare the analyzed captured ID data with the ID data gleaned from the QR code and determine, based on the comparison, that the captured ID data matches the ID data gleaned from the QR code, during the operation 226.

In alternative embodiments, after the money dispensing machine 112 captures the ID data during the operation 224, the money dispensing machine 112 can forward the captured ID data and the QR code to the server 102 during an operation 228. In an embodiment, the server 102 can determine that the captured ID data matches the ID data gleaned from the QR code as discussed above during operations 229 and 230, using the techniques discussed above with reference to the operations 225 and 226. Upon determining a match, the server 102 can provide authorization to the money dispensing machine 112 to dispense the pre-authorized amount to the recipient in an operation 232. Once a determination is made that the recipient associated with the user device 110 is the intended recipient, the money dispensing machine 112 provides the recipient associated with the user device 110 with the pre-authorized amount.

Figure 7:
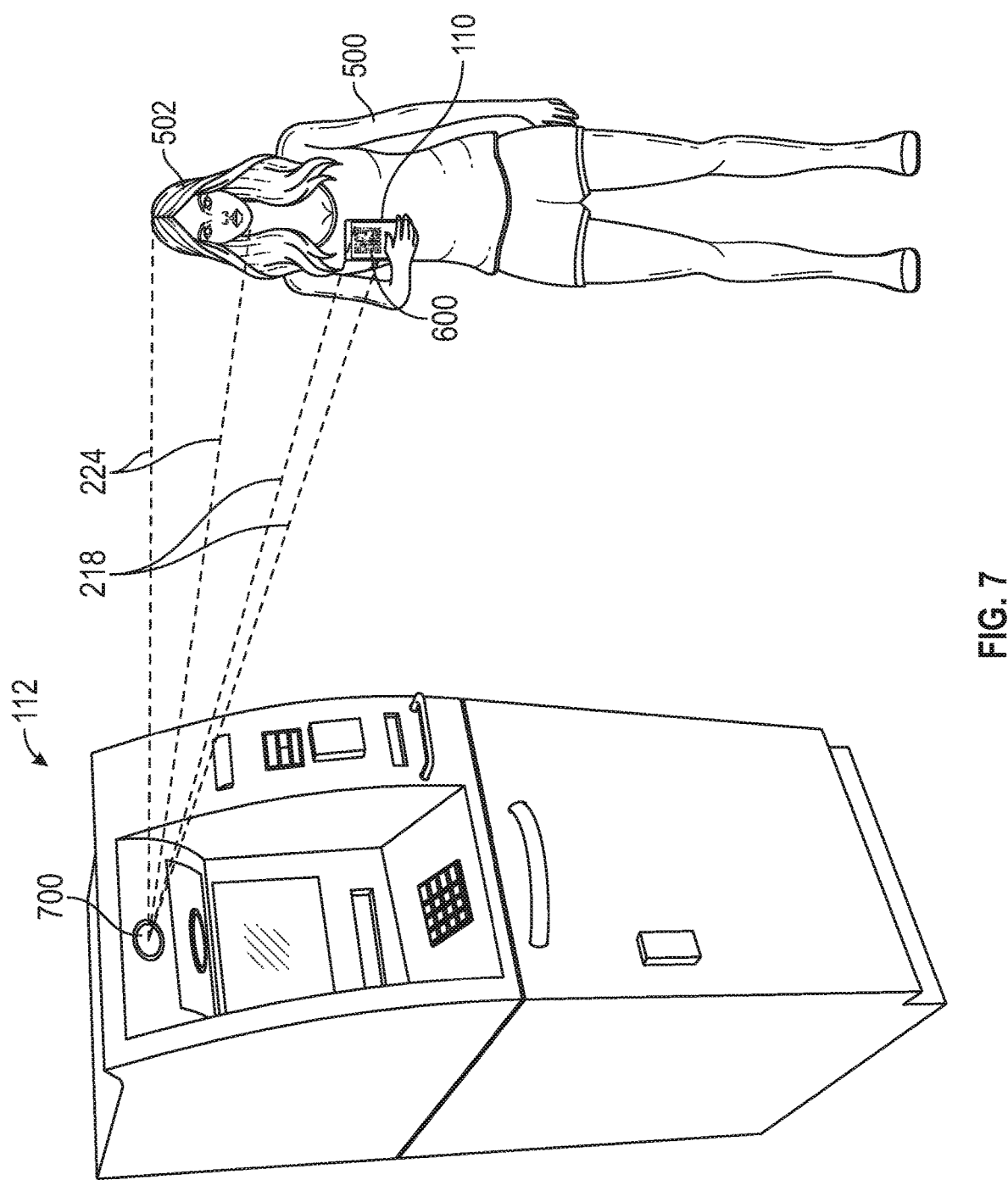
FIG. 7 illustrates a money dispensing machine reading the QR code of FIG. 6 and capturing ID data of a recipient according to an embodiment of the present disclosure.

Returning to the father/daughter example, during the operation 216, the daughter presents the QR code 600 to the money dispensing machine 112, as shown with reference to FIG. 7. In the operation 218, a camera 700 of the money dispensing machine 112 reads the QR code 600. The money dispensing machine 112 then determines that the pre-authorized amount to withdraw from the user account associated with the father is $500 during the operation 220 based on the QR code 600. In addition, the money dispensing machine 112 determines the image data 502, which can correspond to the ID data, associated with the intended recipient, which in the father/daughter example is the daughter, by gleaning this information from the QR code 600 during the operation 222. In response to reading the QR code 600, the money dispensing machine 112 uses the camera 700 to capture ID data associated with the daughter during the operation 224.

In the father/daughter example, after capturing the ID data associated with the daughter, the money dispensing machine 112 performs image analysis on the captured ID data, compares the analyzed data with the ID data gleaned from the QR code 600, and determines that the analyzed data matched the ID data gleaned from the QR code 600 during the operation 226. Thus, the money dispensing machine 112 determines that the daughter is the intended recipient and dispenses $500.

After the money dispensing machine 112 dispenses the $500, the money dispensing machine 112 provides an acknowledgment of the withdrawal to the server 102 during an operation 236. Moreover, in an embodiment, when the money dispensing machine 112 provides the acknowledgement of the withdrawal to the server 102, this causes the server 102 to send an acknowledgement of the withdrawal to the user device 104 that includes an image of the recipient indicating that the pre-authorized amount was withdrawn from the user account associated with the user of the user device 104 during an operation 238. Additionally, the QR code automatically expires after withdrawal of the pre-authorized amount. In the father/daughter example, after the money dispensing machine 112 dispenses the $500, the money dispensing machine 112 sends an acknowledgement of the withdrawal that includes an image of the daughter to the server 102 during the operation 236. The server 102 then sends an acknowledgement of the withdrawal to the father by sending the acknowledgement of withdrawal that includes an image of the daughter to the user device 104 associated with the father during the operation 238.

In the embodiment discussed above with reference to FIGS. 2A and 2B, during the operations 226 and 230, a determination was made that the captured ID data matched the ID data gleaned from the QR code. Thus, the intended recipient was provided the pre-authorized amount during the operation 234. In an alternative embodiment, when the ID data is captured, a match may not be found between the captured ID data and the data gleaned from the QR code. However, in an alternative embodiment, the pre-authorized amount may still be provided, as described with reference to FIGS. 8A-8C, which describe a process flow for allowing a user to pre-authorize withdrawal of money from a user account associated with a user and then allow withdrawal of the pre-authorized amount when captured ID data does not match ID data in a QR code.

Figure 8A:
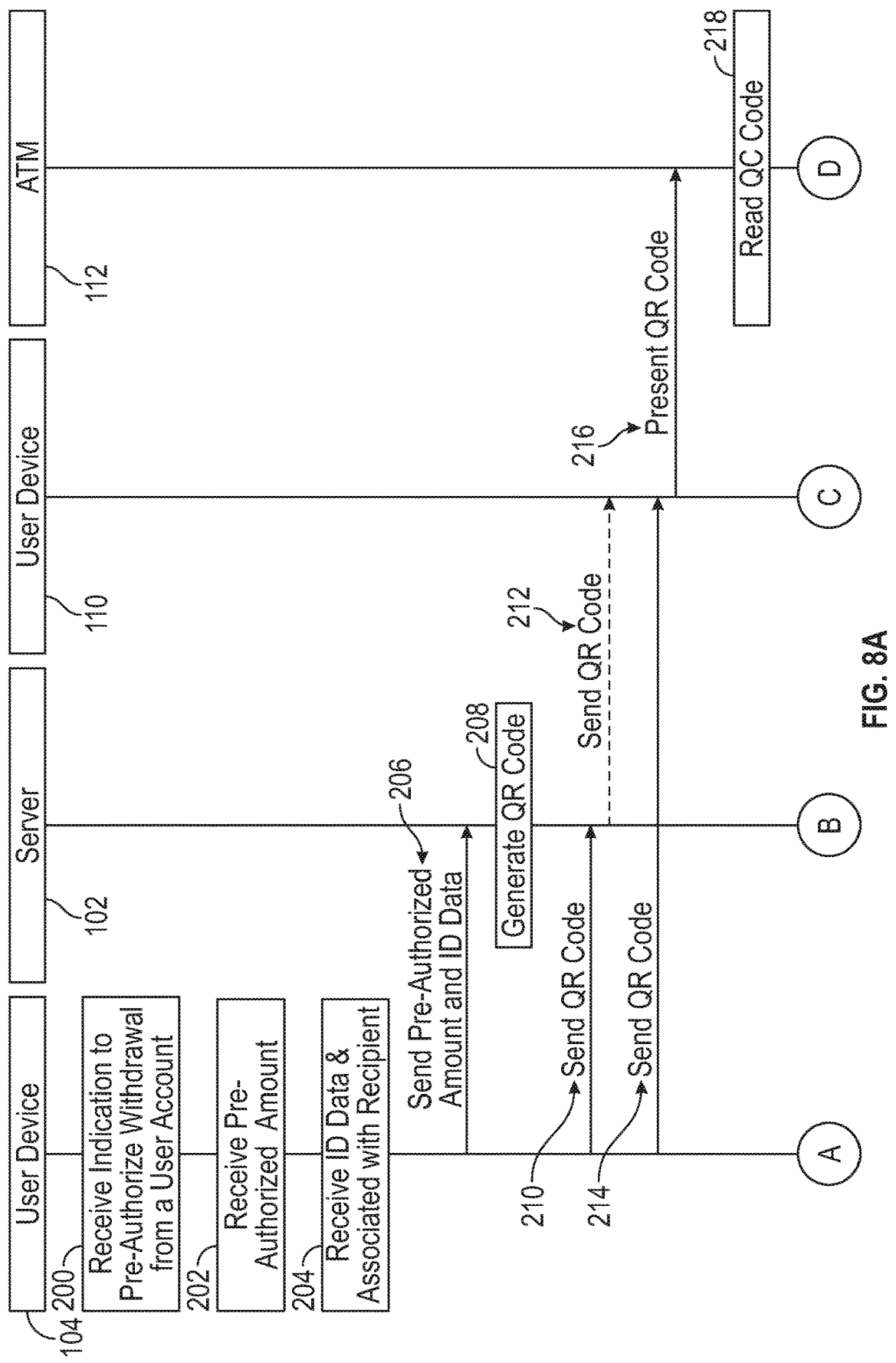
Figure 8B:
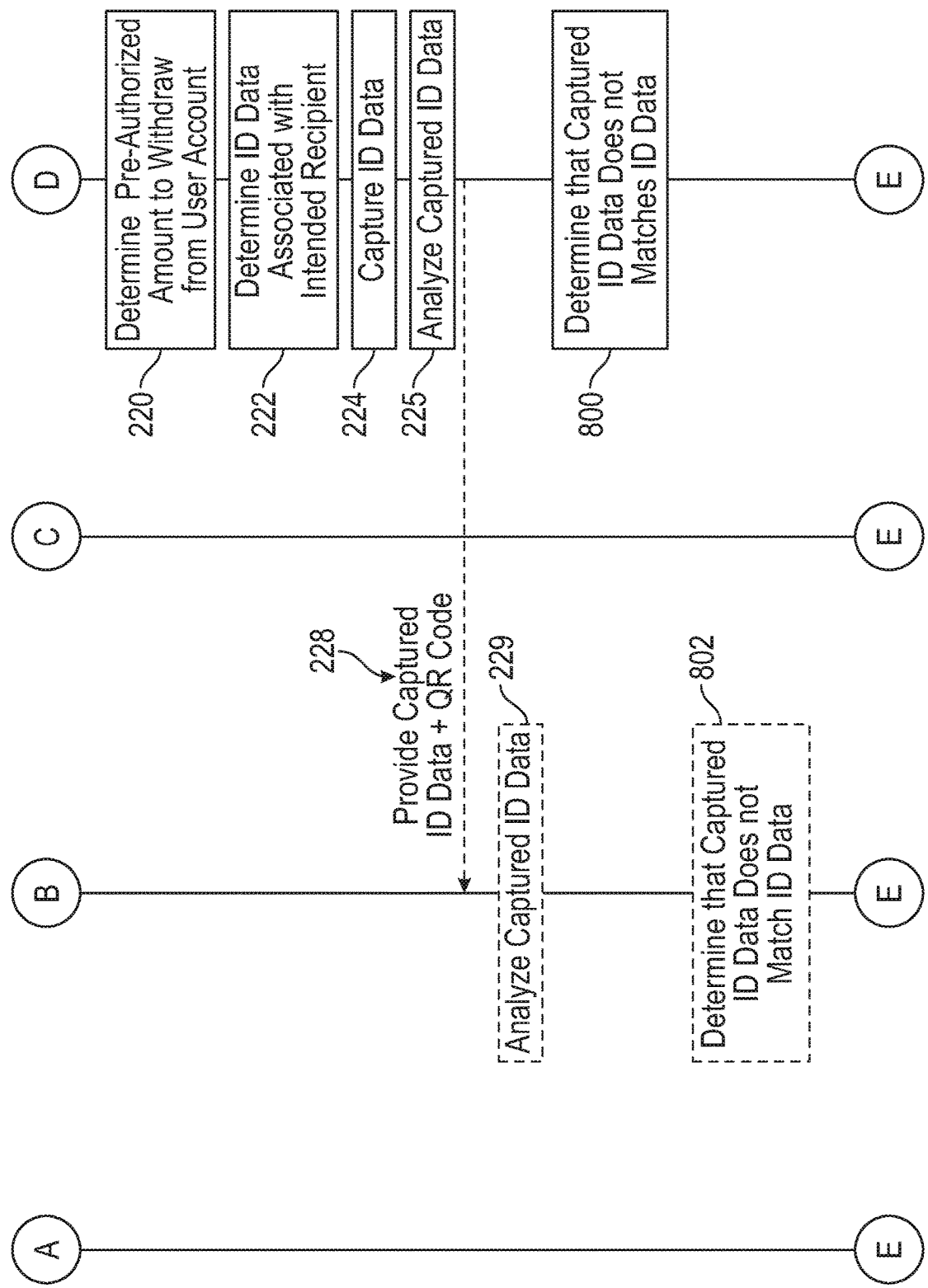

Now making reference to FIG. 8A, the process flow includes the operations 200-224 and 228. The operations 200-224 and 228 shown with reference to FIG. 8A are the same as the operations 200-224 and 228 discussed in detail with reference to FIGS. 2A and 2B. Therefore, discussion will be omitted for the operations 200-224 and 228 shown with reference to FIGS. 8A and 8B. Instead, discussion will begin with operation 800. During the operation 800, after the money dispensing machine 112 has captured ID data of the user presenting the QR card during the operation 224 and analyzed the captured ID data, the money dispensing machine 112 can perform an image analysis on the captured ID data and compare the image analysis with the ID data gleaned from the QR code using the techniques discussed above. However, in this embodiment, during the operation 800, the money dispensing machine 112 can determine that the captured ID data does not match ID data gleaned from the QR code. It should be pointed out that in addition to the money dispensing machine 112 making the determination during the operation 800, alternatively, the server 102 can determine that the captured ID data does not match ID data gleaned from the QR code in a manner similar to the money dispensing machine 112 during an operation 802. In an embodiment, the server 102 can make this determination after the server 102 analyzes the captured ID data during the operation 229 using the techniques described above.

When the money dispensing machine 112 determines that the captured ID data does not match the ID data gleaned from the QR code during the operation 800, the money dispensing machine 112 sends a message to the server 102 along with the captured ID data indicating that the captured ID data does not match the ID data gleaned from the QR code during an operation 804, as shown with reference to FIG. 8C. In an operation 806, the server 102 sends an alert to the user device 104, which displays the alert along with the captured ID data during an operation 808.

Figure 9:
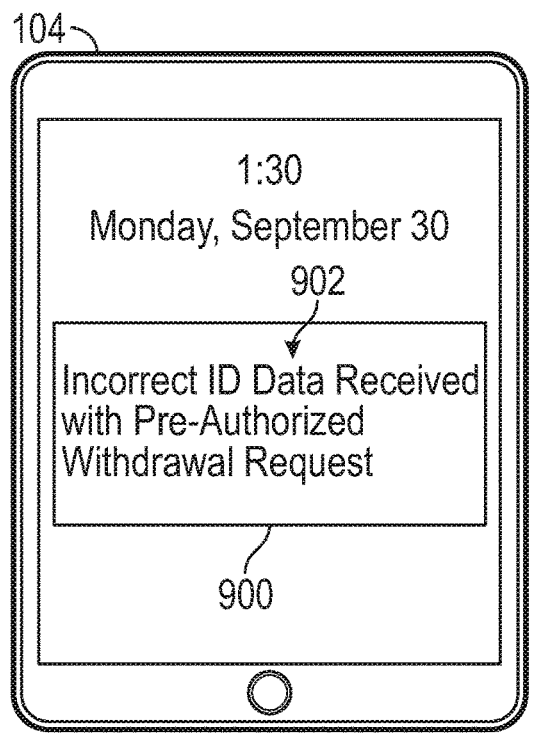
FIG. 9 illustrates an alert, such as a UI, that can be sent to a user device when captured ID data associated with a pre-authorized withdrawal does not match ID associated with an intended recipient, in accordance with an embodiment of the present disclosure.
Figure 10:
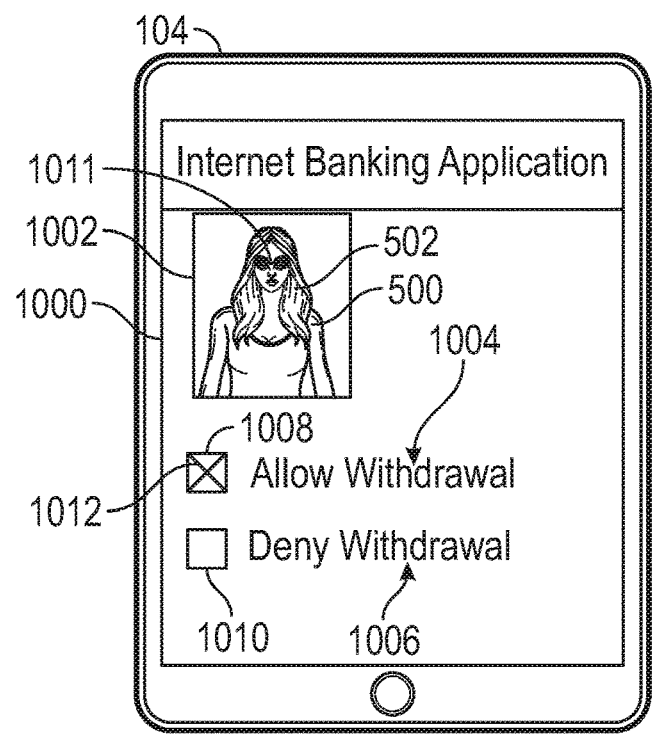
FIG. 10 shows a UI that includes an image of a recipient who attempted to withdraw money pursuant to a pre-authorized withdrawal along with options for responding to the attempted withdrawal, in accordance with an embodiment of the present disclosure.

As an example of a process flow for allowing a user to pre-authorize withdrawal of money from a user account associated with a user when captured ID data does not match ID data in a QR code, again, a daughter who is currently located in Minnesota and attending school in Minneapolis may need to purchase books that cost $500. Thus, the daughter asks her father, who is located in North Carolina, for $500. For the purposes of the disclosure, this example will be referred to as the second father/daughter example. In the second father/daughter example, the operations 200-224 are performed as described above with reference to FIGS. 2A-6. However, during the operation 800, when the money dispensing machine camera 700 captures the image of the daughter, the daughter is wearing glasses (FIG. 10). Thus, during the operation 800, the money dispensing machine 112 determines that the captured ID data does not match the ID data gleaned from the QR code. Accordingly, the money dispensing machine 112 sends a message to the server 102 indicating that captured ID data does not match the ID data gleaned from the QR code during the operation 804. In the second father/daughter example, the server 102 sends an alert to the user device 104 associated with the father, which then displays an alert 900, as shown with reference to FIG. 9, during the operation 808. As may be seen with reference to FIG. 9, the alert 900 can include a message 902 that indicates incorrect ID data was received with the pre-authorization request. In an embodiment, the alert 900 can be a UI presented on the user device 104 associated with the father.

Returning attention to FIG. 8C and the process flow for allowing a user to pre-authorize withdrawal of money from a user account associated with a user when captured ID data does not match ID data in a QR code, after the alert is displayed at the user device 104 in the operation 808, the user associated with the user device 104 and the user account from which the pre-authorized withdrawal was attempted can engage the alert displayed on the user device 104. The user associated with the user device 104 can engage the alert by tapping the alert or engaging the alert by some other well-known means such that the user device 104 receives an engagement of the alert during an operation 810. When the alert is engaged, a UI 1000 is displayed on the device 104, as shown with reference to FIG. 10 during an operation 812. Now making reference to FIG. 10, the UI 1000 includes an image 1002 of the recipient who attempted to withdraw the money pursuant to the pre-authorized withdrawal. In addition, the UI 1000 includes options 1004 and 1006. The option 1004 allows the user associated with the user account to allow the withdrawal. In particular, the user associated with the user account may select checkbox 1008, which allows the pre-authorized withdrawal to proceed. Alternatively, if the user associated with the user account selects checkbox 1010, the pre-authorized withdrawal request is denied.

In an embodiment, when the user associated with the user account decides to allow the pre-authorized withdrawal to proceed, the process flow moves to FIG. 8D and an operation 814 is performed, where a selection of the checkbox 1008, which is a selection authorizing the withdrawal, is received. When the selection authorizing the withdrawal is received during the operation 814, the user device 104 sends an authorization to allow the pre-authorized transaction to proceed to the server 102 during an operation 816. During an operation 818, the server 102 sends an authorization to allow the pre-authorized transaction to proceed to the money dispensing machine 112. In response to receiving the authorization during the operation 818, the money dispensing machine 112 provides the pre-authorized amount to the recipient associated with the user device 110 who requested the pre-authorized withdrawal during an operation 820. Furthermore, after the money dispensing machine 112 provides the pre-authorized amount to the recipient, the money dispensing machine 112 provides an acknowledgment of the withdrawal to the server 102 during an operation 824. Moreover, sending the acknowledgment of the withdrawal to the server 102 causes the server 102 to send an acknowledgement of the withdrawal to the user device 104 indicating that the pre-authorized amount was withdrawn from the user account associated with the user of the user device 104 during an operation 826. In an embodiment, the acknowledgement sent during the operation 826 can include the ID data captured by the money dispensing machine 112. Furthermore, the QR code automatically expires after withdrawal of the pre-authorized amount.

Figure 8E:
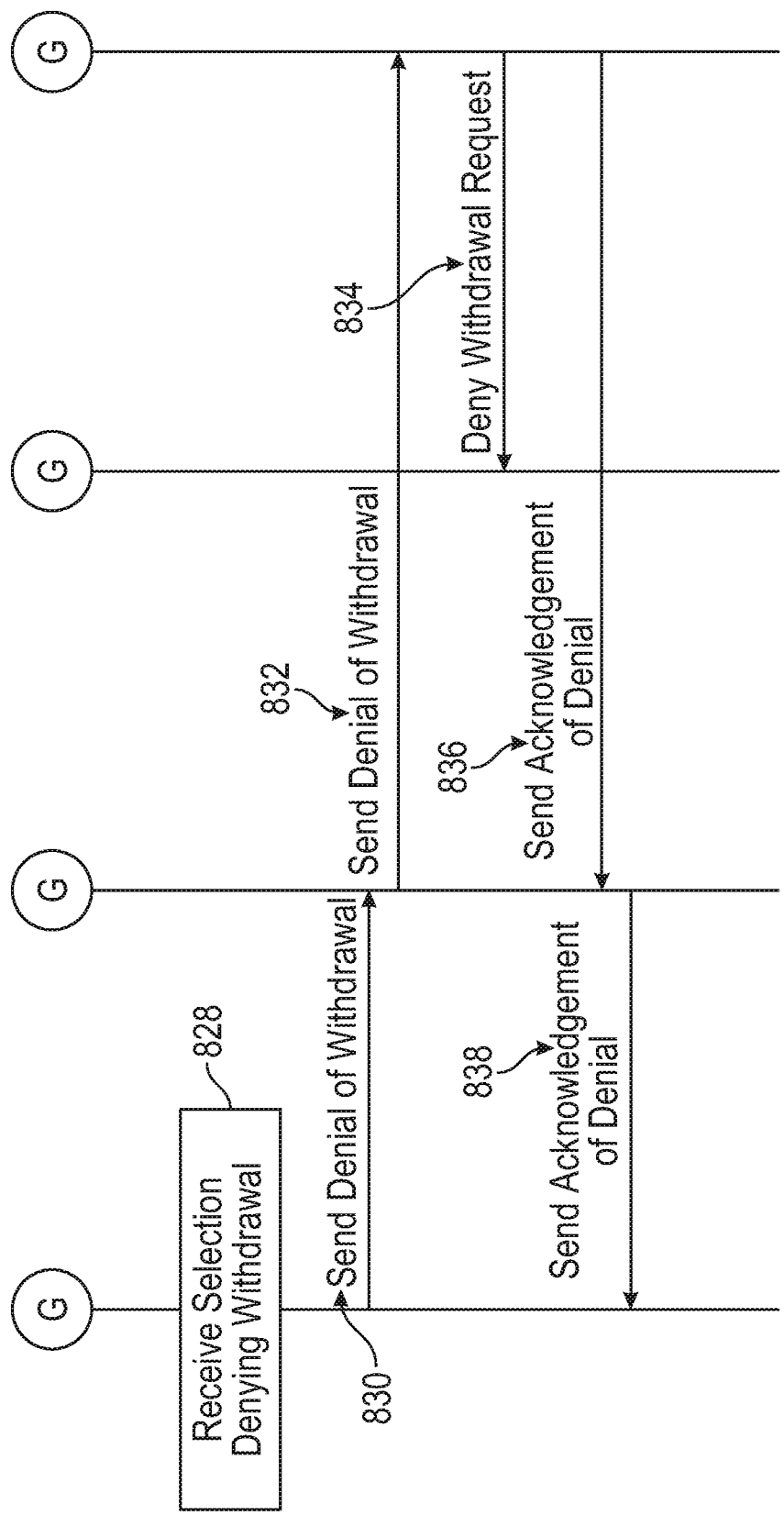

In an alternative embodiment, when the user associated with the user account decides to deny the pre-authorized withdrawal, the process flow moves to FIG. 8E and an operation 828 is performed, where a selection of the checkbox 1010, which is a selection denying the withdrawal, is received. When the selection denying the withdrawal is received during the operation 828, the user device 104 sends a denial of the withdrawal to the server 102 during an operation 830. During an operation 832, the server 102 sends a denial of the withdrawal to the money dispensing machine 112. In response to receiving the denial during the operation 832, the money dispensing machine 112 sends a denial to the recipient associated with the user device 110 who requested the pre-authorized withdrawal during an operation 834. Furthermore, after the money dispensing machine 112 sends the denial to the recipient associated with the user device 110, the money dispensing machine 112 sends an acknowledgment of the denial to the server 102 during an operation 836. Moreover, upon receiving the denial, the server 102 sends an acknowledgement of the denial to the user device 104 indicating that the pre-authorized amount was denied during an operation 838.

Returning to the second father/daughter example, in this example, in the image 500 of the daughter that was the ID data provided during the operation 204, the daughter is not wearing glasses. However, when the money dispensing machine camera 700 captures an image of the daughter during the operation 224, the daughter is wearing glasses. Thus, during the operation 800, the money dispensing machine 112 determines that the captured ID data does not match the ID data gleaned from the QR code. Accordingly, the money dispensing machine 112 sends a message along with the captured ID data to the server 102 indicating that the ID data does not match during the operation 804. In response, the server 102 sends an alert to the user device 104 associated with the father during the operation 806. In the second father/daughter example, the UI 1000 is displayed on the user device 104 associated with the father. The UI 1000 includes the image 1002, which shows his daughter wearing glasses 1011. In response to seeing the image 1002 that shows his daughter wearing the glasses 1011, the father selects the option 1004 by placing an indicia 1012, such as an "X," in the checkbox 1008. Thus, during the operation 814, the user device 104 receives a selection authorizing the withdrawal during the operation 814.

Upon receiving the authorization, the user device 104 sends an authorization to allow the pre-authorized transaction to proceed to the server 102 during the operation 816. In response to receiving the authorization, in the second father/daughter example, the server 102 sends an authorization to allow the pre-authorized transaction to proceed to the money dispensing machine 112 during the operation 818. In response to receiving the authorization during the operation 818, the money dispensing machine 112 provides $500 to the daughter during the operation 820. Furthermore, after the money dispensing machine 112 dispenses $500 to the daughter, the money dispensing machine 112 provides an acknowledgment of the withdrawal to the server 102 during the operation 824. Moreover, upon receiving the acknowledgement of the withdrawal, the server 102 sends an acknowledgement of the withdrawal to the father indicating that $500 was withdrawn from the user account associated with the father during the operation 826.

As discussed above, embodiments provide a system and method that allows a user to pre-authorize a withdrawal from an account associated with a user. Therefore, a user can provide money directly from an account associated with the user to a recipient who lacks access to the account without having to physically be present with the recipient. Thus, the user may be at a first location while the recipient is at a second location separate and remote from the first location. Moreover, the recipient is able to withdraw money directly from the user account associated with the user. Thus, the user does not have to transfer funds from the account associated with the user to an account associated with a recipient, thereby avoiding transactional costs, such as fees and time. In addition, the user does not have to provide any type of personal security information to the recipient, such as a personal identification number, or any other security indicia that the user would prefer to keep private.

In addition, the user of a QR code along with the ID data, such as image data, adds two levels of security. In particular, the QR code is one level of security while the ID data is a second level of security. Moreover, when the image data captured at a money machine does not match the image data gleaned from a QR code, instead of denying the withdrawal request outright, the incorrect match is sent to the user associated with the user account from which the money is being withdrawn. Thus, the user can determine if the recipient attempting to receive the money is in fact the intended recipient. In further embodiments, even when the captured ID data matches the ID data gleaned from the QR code, the image data can be sent to the user associated with the user account from which the money is being withdrawn. In an embodiment, this can serve as a third layer of security.

In a further embodiment, the user can make the QR code recurring over a given time period. To further illustrate, in the father/daughter example, the daughter may need to purchase books every semester. In an embodiment, the QR code can automatically be generated at the beginning of every semester and presented to the father. The father can then forward along the automatically generated QR code to the daughter. Alternatively, upon automatic generation, the QR code can automatically be sent to both the father and the daughter. It should be pointed out that after the user provides the ID data associated with the recipient as discussed above, the processes described herein can be performed without the involvement of any users, such as the father and/or the daughter in the examples described above.

Figure 11:
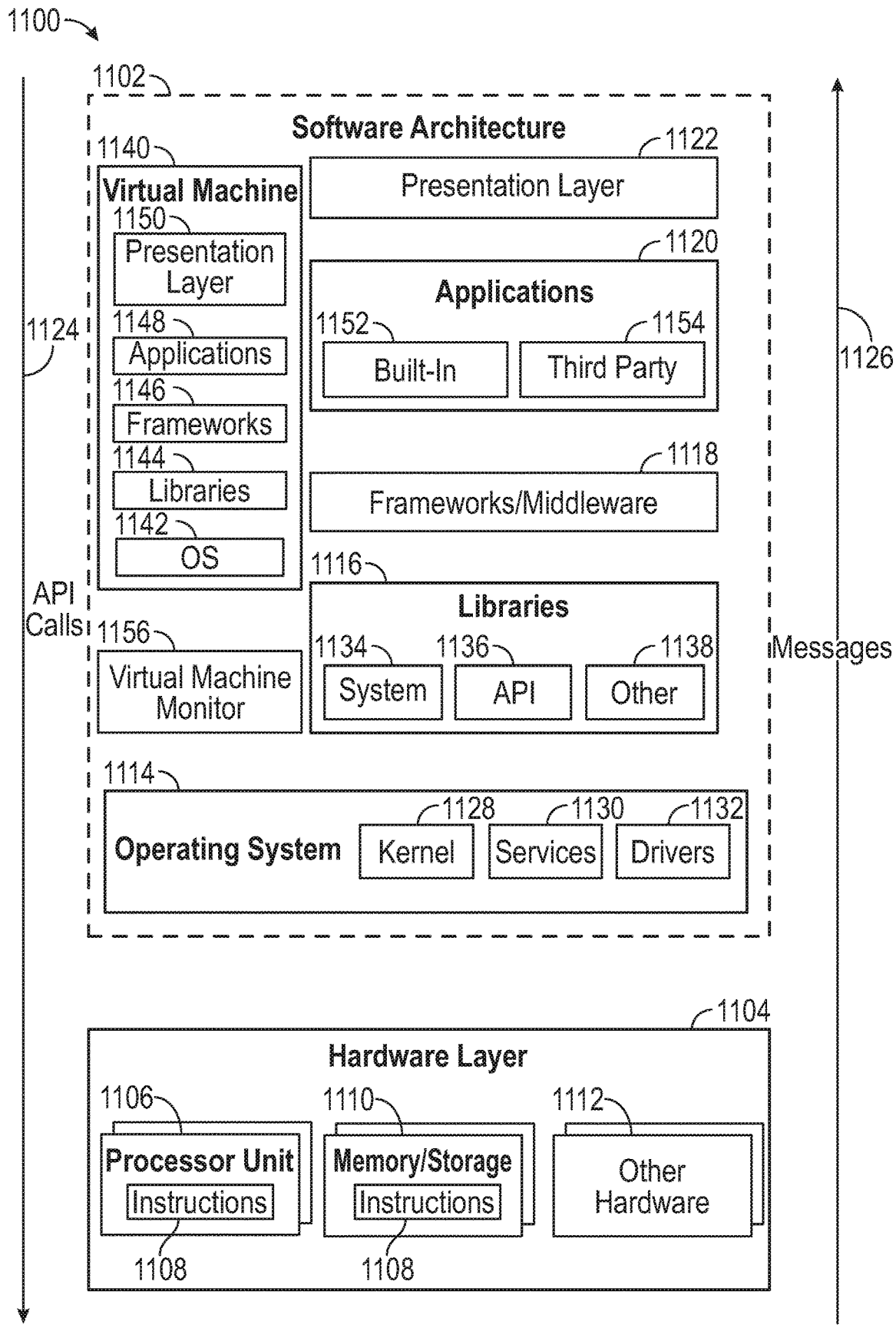
FIG. 11 is a block diagram showing one example of a software architecture for a computing device, in accordance with an embodiment of the present disclosure.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture 1102 and many other architectures may be implemented to facilitate the functionality described herein. The software architecture 1102 may be executed on hardware such as, for example, any of the systems or subsystems described herein. A representative hardware layer 1104 is illustrated and can represent, for example, any of the above referenced computing devices. In some examples, the hardware layer 1104 may be implemented according to the architecture 1102 of FIG. 11 and/or the architecture 1200 of FIG. 12.

The representative hardware layer 1104 comprises one or more processing units 1106 having associated executable instructions 1108. Executable instructions 1108 represent the executable instructions of the software architecture 1102, including implementation of the methods, systems, components, and so forth of FIGS. 1, 2A, 2B, and 8A-8E. Hardware layer 1104 also includes memory/storage modules/data storage 1110, which also have executable instructions 1108. Hardware layer 1104 may also comprise other hardware as indicated by other hardware 1112 which represents any other hardware of the hardware layer 1104, such as the other hardware illustrated as part of hardware architecture 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and a presentation layer 1122. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the architecture 1102 to pause its current processing and execute an interrupt service routine (ISR) when an interrupt is received. The ISR may generate the alert, for example, as described herein.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.302, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1152 and/or third-party applications 1154. Examples of representative built-in applications 1152 may include, but are not limited to, a contacts application, a browser application, a book reader application, a location application, a media application, a messaging application, and/or a game application. Third-party applications 1154 may include any of the built-in applications 1152 as well as a broad assortment of other applications. In a specific example, the third-party application 1154 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1154 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system libraries 1134, API libraries 1136, and other libraries 1138), frameworks/middleware 1118 to create user interfaces to interact with users of the system. Alternatively, or additionally, in some systems, interactions with a user may occur through a presentation layer, such as presentation layer 1122. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 11, this is illustrated by virtual machine 1140. A virtual machine creates a software environment where applications/modules can execute as if they were executing on a hardware computing device. A virtual machine 1140 is hosted by a host operating system (operating system 1114) and typically, although not always, has a virtual machine monitor 1156, which manages the operation of the virtual machine 1140 as well as the interface with the host operating system (i.e., operating system 1114). A software architecture executes within the virtual machine 1140 such as an operating system 1142, libraries 1144, frameworks/middleware 1146, applications 1148 and/or presentation layer 1150. These layers of software architecture executing within the virtual machine 1140 can be the same as corresponding layers previously described or may be different.

Figure 12:
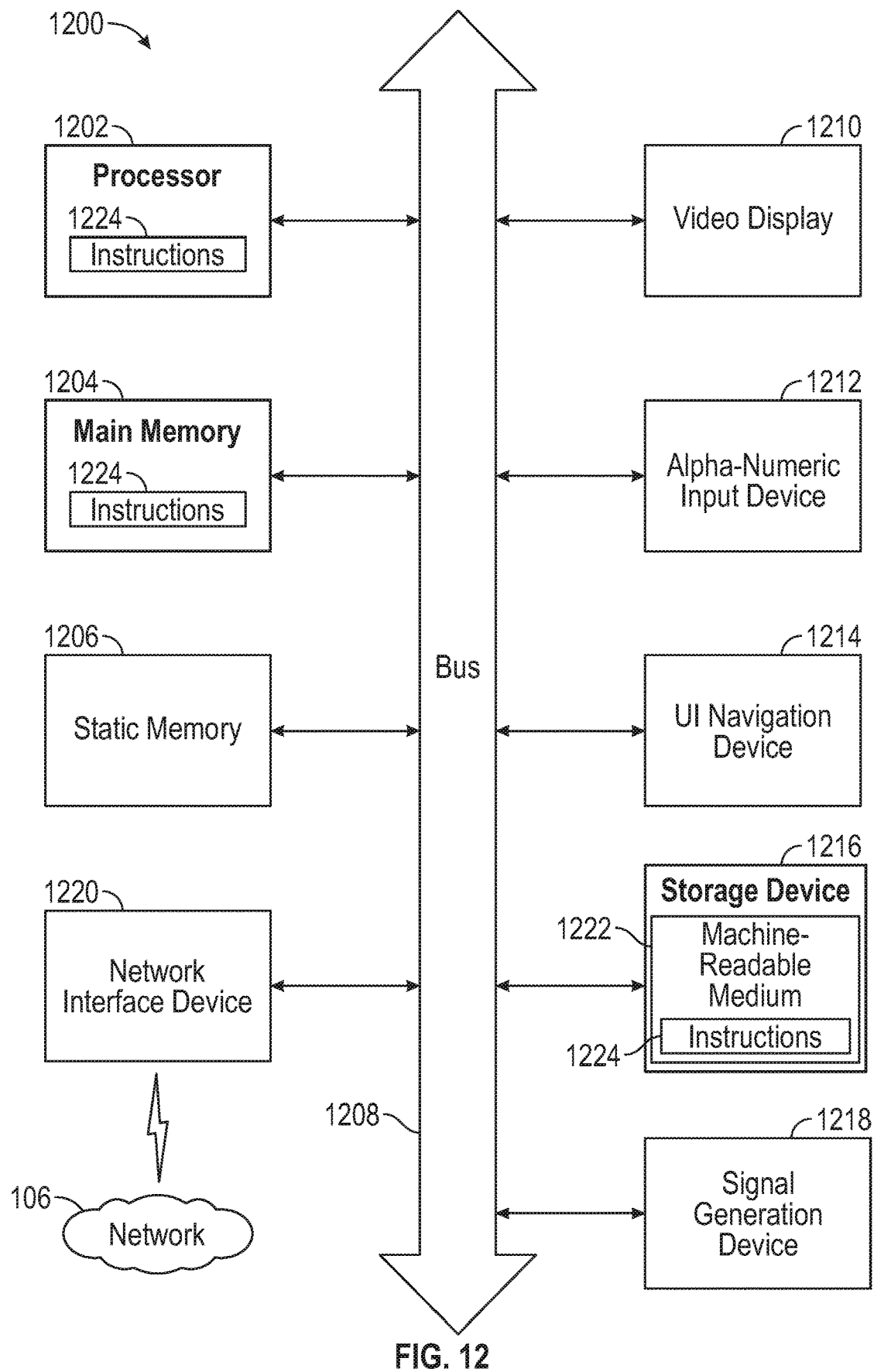
FIG. 12 is a block diagram illustrating a computing device hardware architecture, within which a set or sequence of instructions can be executed to cause the machine to perform examples of any one of the methodologies discussed herein, in accordance with an embodiment of the present disclosure.

FIG. 12 is a block diagram illustrating the computing device hardware architecture 1200, within which a set or sequence of instructions can be executed to cause the machine to perform examples of any one of the methodologies discussed herein. For example, the architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), such as any of the server 102, the user devices 104 and 110, a tablet PC, a hybrid tablet, a set-top box (STB), a personal digital assistant (PDA), a mobile telephone, a web appliance, a network router, switch or bridge, or any machine capable of executing instructions (sequential or otherwise) that specify operations to be taken by that machine.

Example architecture 1200 includes a processor unit 1202 comprising at least one processor (e.g., a central processing unit (CPU), a graphics processing unit (GPU) or both, processor cores, compute nodes, etc.). The architecture 1200 may further comprise a main memory 1204 and a static memory 1206, which communicate with each other via a link 1208 (e.g., bus). The architecture 1200 can further include a video display unit 1210, an alphanumeric input device 1212 (e.g., a keyboard), and a user interface (UI) navigation device 1214 (e.g., a mouse). In some examples, the video display unit 1210, input device 1212 and UI navigation device 1214 are incorporated into a touch screen display. The architecture 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

In some examples, the processor unit 1202 or other suitable hardware component may support a hardware interrupt. In response to a hardware interrupt, the processor unit 1202 may pause its processing and execute an interrupt service routine (ISR), for example, as described herein.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, static memory 1206, and/or within the processor unit 1202 during execution thereof by the architecture 1200, with the main memory 1204, static memory 1206, and the processor unit 1202 also constituting machine-readable media. Instructions 1224 stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over the network 106 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions (e.g., instructions 1224) for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method comprising:
receiving a pre-authorized amount to be withdrawn from an account associated with a user different from a recipient intended to receive the pre-authorized amount;
providing a user interface to a first device associated with the user to prompt the user to provide first image data associated with the intended recipient;
receiving, from the first device when the user provides the first image data at the user interface, the first image data associated with the intended recipient in response to providing the user interface to the user, the intended recipient lacking access to the account associated with the user;
generating a code that includes the pre-authorized amount and the first image data when the first image data and the pre-authorized amount are received;
providing the code to a second device associated with the intended recipient and separate from the first device;
receiving, from a third device, second image data from a recipient different from the intended recipient at the second device, wherein:
the code is received from the recipient at the third device; and
the second image data is captured via an image capture device at the third device;
reading the code received from the recipient at the third device, wherein reading the code causes the third device to capture the second image data;
comparing the second image data associated with the recipient with the first image data associated with the intended recipient, wherein the comparison comprises:

performing digital image processing on the second image data to extract a portion of the image data; and
comparing the extracted portion of the image data with the first image data in response to reading the code;
determining if the recipient is the intended recipient based on the comparison;
determining that the recipient is not the intended recipient based on the comparison;
causing an alert to be sent and displayed on the first device, the alert being sent based on determining that the recipient is not the intended recipient, wherein the alert includes image data associated with the recipient and an option to authorize providing of the pre-authorized amount to the recipient;
receiving an authorization from the user in response to the alert being displayed to provide the pre-authorized amount to the recipient when a determination is made that the recipient is not the intended recipient based on the comparison; and
providing to the second device authorization for the recipient to receive the pre-authorized amount at the second device upon receiving the authorization, thereby allowing the recipient to directly withdraw at the third device the pre-authorized amount without access to the account associated with the user based on the recipient providing the code.

2. The method of claim 1, wherein the user is at a first location and the recipient is at a second location remote from the first location and the recipient receives the pre-authorized amount from the account associated with the user at the second location when the user is at the first location separate from the second location.

3. The method of claim 1, further comprising receiving an acknowledgement that includes captured second image data of the recipient.

4. The method of claim 1, wherein the code expires when the pre-authorized amount is provided to the recipient.

5. The method of claim 1, wherein the code is a quick response code.

6. A non-transitory, machine-readable medium, comprising instructions, which when performed by a processor of a first computing device, causes the processor to perform operations to:
receive a pre-authorized amount to be withdrawn from an account associated with a user different from a recipient intended to receive the pre-authorized amount;
provide a user interface to a first device associated with the user to prompt the user to provide first image data associated with the intended recipient;
receive, from the first device when the user provides the first image data at the user interface, the first image data associated with the intended recipient in response to providing the user interface to the user, the intended recipient lacking access to the account associated with the user;
generate a code that includes the pre-authorized amount and the first image data when the first image data and the pre-authorized amount are received;
provide the code to a second device associated with the intended recipient and separate from the first device;
receive, from a third device, second image data from a recipient different from the intended recipient at the second device, wherein:
the code is received from the recipient at the third device; and
the second image data is captured via an image capture device at the third device;
read the code received from the recipient at the third device, wherein reading the code causes the third device to capture the second image data;
compare the second image data associated with the recipient with the first image data associated with the intended recipient, wherein the comparing comprises:
performing digital image processing on the second image data to extract a portion of the image data; and
comparing the extracted portion of the image data with the first image data in response to reading the code;
determine if the recipient is the intended recipient based on the comparison;
determine that the recipient is not the intended recipient based on the comparison;
cause an alert to be sent and displayed on the first device, the alert being sent based on determining that the recipient is not the intended recipient, wherein the alert includes image data associated with the recipient and an option to authorize providing of the pre-authorized amount to the recipient;
receive an authorization from the user in response to the alert being displayed to provide the pre-authorized amount to the recipient when a determination is made that the recipient is not the intended recipient based on the comparison; and
provide to the second device authorization for the recipient to receive the pre-authorized amount at the second device upon receiving the authorization, thereby allowing the recipient to directly withdraw at the third device the pre-authorized amount without access to the account associated with the user based on the recipient providing the code.

7. The non-transitory, machine-readable medium of claim 6, wherein the user is at a first location and the recipient is at a second location remote from the first location and the recipient receives the pre-authorized amount from the account associated with the user at the second location when the user is at the first location separate from the second location.

8. The non-transitory, machine-readable medium of claim 6, wherein the instructions further cause the processor to perform operations to receive an acknowledgement that includes captured second image data of the recipient and the code is a quick response code that expires when the pre-authorized amount is provided to the recipient.

9. A computing device comprising:
processing circuitry; and
a memory device including instructions embodied thereon, wherein the instructions, which when executed by the processing circuitry, configure the processing circuitry to perform operations that:
receive a pre-authorized amount to be withdrawn from an account associated with a user different from a recipient intended to receive the pre-authorized amount;
provide a user interface to a first device associated with the user to prompt the user to provide first image data associated with the intended recipient;
receive, from the first device when the user provides the first image data at the user interface, the first image data associated with the intended recipient in response to providing the user interface to the user, the intended recipient lacking access to the account associated with the user;
generate a code that includes the pre-authorized amount and the first image data when the first image data and the pre-authorized amount are received;

provide the code to a second device associated with the intended recipient and separate from the first device;

receive, from a third device, second image data from a recipient different from the intended recipient at the second device, wherein:

the code is received from the recipient at the third device; and the second image data is captured via an image capture device at the third device;

read the code received from the recipient at the third device, wherein reading the code causes the third device to capture the second image data;

compare the second image data associated with the recipient with the first image data associated with the intended recipient, wherein the comparing comprises:

performing digital image processing on the second image data to extract a portion of the image data; and comparing the extracted portion of the image data with the first image data in response to reading the code;

determine if the recipient is the intended recipient based on the comparison;

determine that the recipient is not the intended recipient based on the comparison;

cause an alert to be sent and displayed on the first device, the alert being sent based on determining that the recipient is not the intended recipient, wherein the alert includes image data associated with the recipient and an option to authorize providing of the pre-authorized amount to the recipient;

receive an authorization from the user in response to the alert being displayed to provide the pre-authorized amount to the recipient when a determination is made that the recipient is not the intended recipient based on the comparison; and provide to the second device authorization for the recipient to receive the pre-authorized amount at the second device upon receiving the authorization, thereby allowing the recipient to directly withdraw at the third device the pre-authorized amount without access to the account associated with the user based on the recipient providing the code.

10. The computing device of claim 9, wherein the user is at a first location and the recipient is at a second location remote from the first location and the recipient receives the pre-authorized amount from the account associated with the user at the second location when the user is at the first location separate from the second location and the code is a quick response code that expires when the pre-authorized amount is provided to the recipient.

* * * * *